United States Patent
Gan et al.

(10) Patent No.: US 9,967,724 B1
(45) Date of Patent: May 8, 2018

(54) METHOD AND APPARATUS FOR CHANGING A PERSONA OF A DIGITAL ASSISTANT

(71) Applicant: MOTOROLA SOLUTIONS, INC., Chicago, IL (US)

(72) Inventors: Guo Dong Gan, Kuala Lumpur (MY); Kong Yong Foo, Bayan Lepas (MY); Mun Yew Tham, Bayan Lepas (MY); Bing Qin Lim, Jelutong (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 10 days.

(21) Appl. No.: 15/588,760

(22) Filed: May 8, 2017

(51) Int. Cl.
*H04M 11/04* (2006.01)
*H04W 4/22* (2009.01)
*H04W 84/18* (2009.01)
*H04W 88/02* (2009.01)

(52) U.S. Cl.
CPC .............. *H04W 4/22* (2013.01); *H04W 84/18* (2013.01); *H04W 88/02* (2013.01)

(58) Field of Classification Search
CPC ........... H04W 4/00; H04W 4/02; H04W 4/12; H04W 4/22; H04W 8/18; H04W 64/00; H04W 76/007; H04M 1/172519; H04M 1/17253

USPC ......... 455/404.1, 404.2, 414.1, 414.2, 414.3, 455/456.1, 556.2, 567
See application file for complete search history.

(56) References Cited

U.S. PATENT DOCUMENTS

| | | | |
|---|---|---|---|
| 6,144,938 A | 11/2000 | Surace et al. | |
| 2003/0167167 A1* | 9/2003 | Gong | G06F 3/16 704/250 |
| 2008/0096533 A1 | 4/2008 | Manfredi et al. | |
| 2011/0028121 A1* | 2/2011 | Sennett | H04W 4/22 455/404.1 |
| 2011/0151829 A1* | 6/2011 | Velusamy | H04L 51/20 455/404.2 |
| 2014/0136187 A1* | 5/2014 | Wolverton | G06F 17/30654 704/9 |
| 2015/0134456 A1* | 5/2015 | Baldwin | G06Q 30/0267 705/14.64 |
| 2016/0156772 A1* | 6/2016 | Zeilingold | H04M 1/72572 455/418 |
| 2016/0217669 A1* | 7/2016 | Benoit | G08B 25/009 |
| 2016/0328967 A1* | 11/2016 | Haag | G06Q 50/26 |

* cited by examiner

*Primary Examiner* — Temica M Beamer

(57) ABSTRACT

A method and apparatus for changing a persona of a digital assistant is provided herein. During operation a digital assistant will determine a public-safety incident type and then change its persona based on the public-safety incident type.

9 Claims, 5 Drawing Sheets

METHOD AND APPARATUS FOR CHANGING A PERSONA OF A DIGITAL ASSISTANT

FIELD OF THE INVENTION

The present invention generally relates to digital assistants and more particularly to a method and apparatus for changing a persona or voice characteristics of a digital assistant.

BACKGROUND OF THE INVENTION

Many communication devices comprise digital assistants that can provide users with valuable information. The information provided to a user can be based on questions posed by the user or based on other triggers. For example, digital assistants, such as Siri provided by Apple, Inc.® and Google Now provided by Google, Inc.®, are software applications that understand natural language, and complete electronic tasks in response to user voice inputs. These digital assistants take dictation, read a text message or an e-mail message, look up phone numbers, anticipate requests, place calls, generate reminders, warn users, and provide many types of other information.

A problem exists in that a digital assistant tends to always speak in the same persona, with the same voice and voice characteristics (same gender, tone, cadence, timbre, phonation, resonance, . . . , etc.). Because of this, digital assistant are very poor at conveying urgency, importance, or other characteristics of an utterance. Also, digital assistant are very poor in providing a user experience that allows user to distinguish an emergency incident. For example, a police officer using a virtual assistance (sometimes referred to as a virtual partner) will have a same voice provide information about a license plate and a warning that an armed person is behind them. Therefore, a need exists for a method and apparatus for changing a persona or the voice characteristics of a digital assistant to better convey an urgency of an utterance.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for changing a persona of a digital assistant is provided herein. During operation a digital assistant will determine a public-safety incident type and then change its persona based on the public-safety incident type. For example, a digital assistant may determine an incident type by analyzing a computer-aided dispatch identification (CAD ID), an importance of a message, a type of incident, a type of message, a type of message sender, a type of priority level of the message . . . , etc. Based on at least some of these criteria, the digital assistant will adjust its voice/persona accordingly.

As an example of the above, consider a police officer that has a digital assistant periodically report traffic information. The digital assistant may use a first persona (e.g., a male voice called "Fred") when low-priority information (such as traffic) is being conveyed to the officer. Fred's voice may often be ignored by the police officer because of how often Fred provides information to the officer. However, the digital assistant may use a second persona (e.g., a female called "Laura") when high-priority information (such as a gunshot reported) is being conveyed to the officer. Because the officer knows that "Laura" only speaks when important information is conveyed, the officer will be more likely to pay attention to what Laura has to say.

Figure 1:
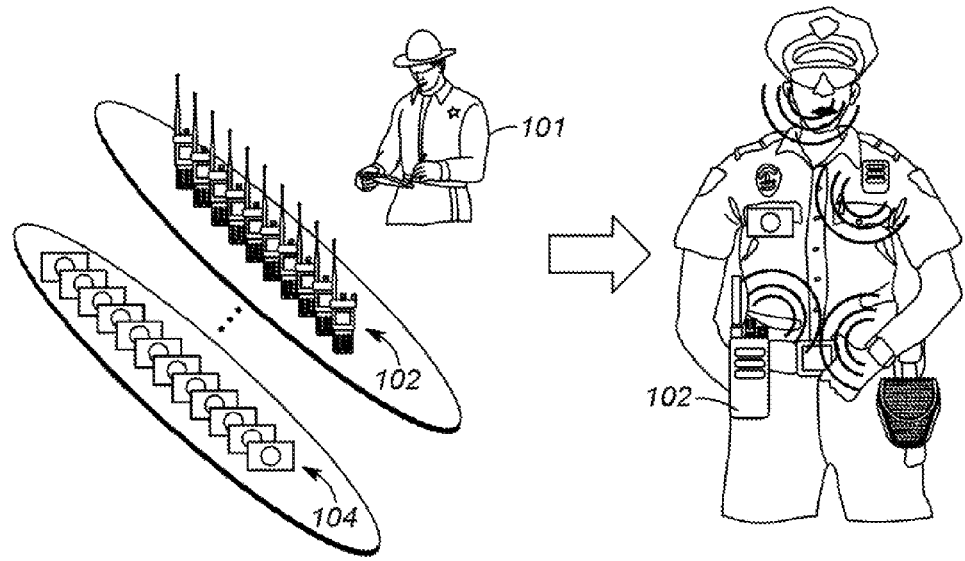
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer. These conditions are generally reported back to a dispatch operator so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, . . . , etc. All devices pulled by the officer will be configured to form a PAN by associating (pairing) with each other and communicating wirelessly among the devices. At least one device will be configured with a digital assistant.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may pull one radio 102 and one camera 104 for use during their shift. Other devices may be pulled as well. As shown in FIG. 1, officer 101 will preferably wear the devices during a shift by attaching the devices to clothing. These devices will form a PAN throughout the officer's shift.

As mentioned, at least one device worn by the officer will comprise a digital assistant. For example, radio 102 may be configured with a digital assistant application (not shown in FIG. 1). As described above, the digital assistant application may receive a user-initiated query through audio data (i.e., a spoken query), text data (i.e., a written or typed query), or a combination thereof. Additionally, the digital assistant application may receive data from other devices via the PAN, and provide necessary information to the officer based on the received data.

Figure 2:
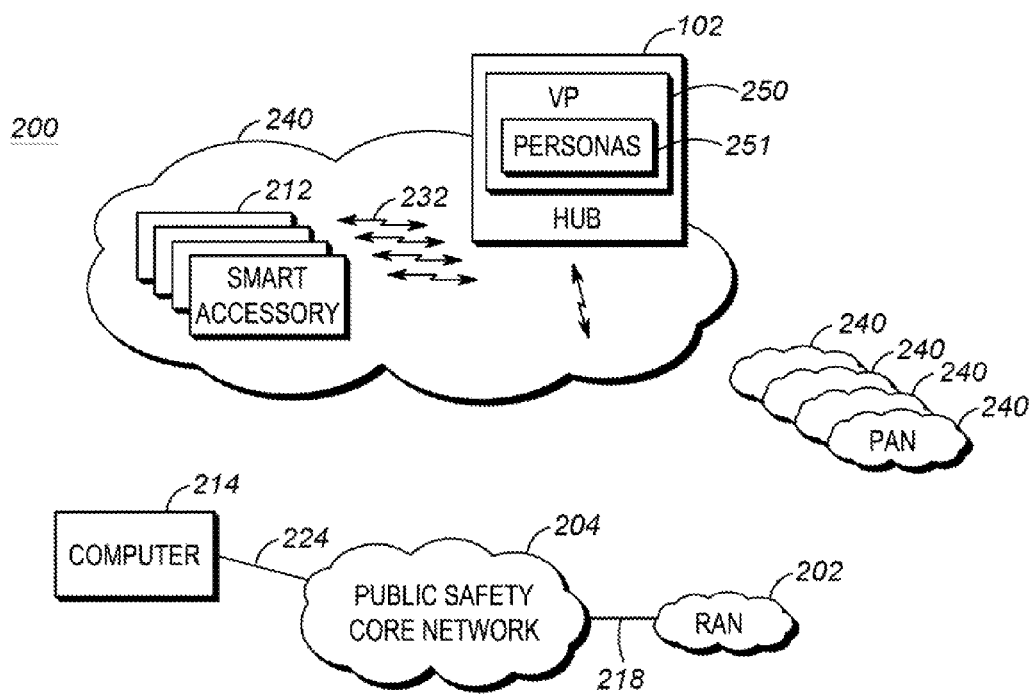
FIG. 2 depicts an example communication system that incorporates a personal-area network and a digital assistant.

FIG. 2 depicts an example communication system 200 that incorporates PANs created as described above along with a digital assistant. System 200 includes one or more radio access networks (RANs) 202, a public-safety core network 204, hub (PAN master device) 102, local devices (slave devices that serve as smart accessories) 212, a computer 214, and communication links 218, 224, and 232. In a preferred embodiment of the present invention, hub 102 and devices 212 form PAN 240, with communication links 232 between devices 212 and hub 102 taking place utilizing a short-range communication system protocol such as a Bluetooth communication system protocol. Each officer will have an associated PAN 240. Thus, FIG. 2 illustrates multiple PANs 240 associated with multiple officers.

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art.

Public-safety core network 204 may include one or more packet-switched networks and/or one or more circuit-switched networks, and in general provides one or more public-safety agencies with any necessary computing and communication needs, transmitting any necessary public-safety-related data and communications.

Hub 102 serves as a PAN master device, and may be any suitable computing and communication devices configured to engage in wireless communication with the RAN 202 over the air interface as is known to those in the relevant art. Moreover, one or more hub 102 are further configured to engage in wired and/or wireless communication with one or more local device 212 via the communication link 232. Hub 102 will be configured to determine when to forward information via RANs 202 based on a combination of device 212 inputs.

As shown, hub 102 comprises a digital assistant 250 (virtual partner) comprising a personas 251. Information is provided to a user by the digital assistant 250 using a particular persona 251. For example, hub 102 may receive sensor information from any one of sensors 212. Digital assistant 250 may change the persona based on sensor input. So, for example, if a camera 212 notifies hub 102 of an armed person, digital assistant 250 may use a first persona to warn the officer however, if traffic information is received from RAN 202, a second persona may be used to provide an audible indication of the traffic.

In yet a further embodiment of the present invention, a computer-aided dispatch (CAD) incident identifier is utilized to determine a current persona assigned to a digital assistant. An incident identification (sometimes referred to as an incident scene identifier, or a CAD incident identifier (CAD ID)) is generated for incidents where an officer is dispatched, or where an officer encounters a public-safety event. This ID could be something as simple as a number associated with a particular incident type, or something as complicated as an identification that is a function of populated fields, one of which may comprise an incident type. So, for example, when a first CAD ID is detected by digital assistant 250, a first persona 251 may be utilized, and when a second CAD ID is detected by digital assistant 250, a second persona 251 may be utilized.

It should be noted that in FIG. 2 digital assistant 250 is shown existing in hub 102, however, in alternate embodiments of the present invention, digital assistant 250 may exist in any connected PAN device 212.

It should also be noted that the term "persona" is envisioned to comprise an aspect of a digital assistant that is perceived audibly and/or visually by others. Thus, a persona may be changed by changing a character (e.g., Fred to Laura), or by changing an aspect of a character's voice (e.g., excited Fred to non-excited Fred).

It should also be noted that any one or more of the communication links 218, 224, could include one or more wireless-communication links and/or one or more wired-communication links.

Devices 212 and hub 102 may comprise any device capable of forming a PAN. For example, devices 212 may comprise a gun-draw sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a barometer, speech recognition circuitry, a gunshot detector, . . . , etc.

Finally, computer 214 comprises, or is part of a computer-aided-dispatch center, manned by an operator providing necessary dispatch operations. For example, computer 214 typically comprises a graphical user interface that provides the dispatch operator necessary information about public-safety officers. As discussed above, much of this information originates from devices 212 providing information to hub 102, which forwards the information to RAN 202 and ultimately to computer 214. Computer 214 may also assign an officer to an incident by providing a CAD ID to hub 102, which may cause persona 251 to change accordingly.

Figure 3:
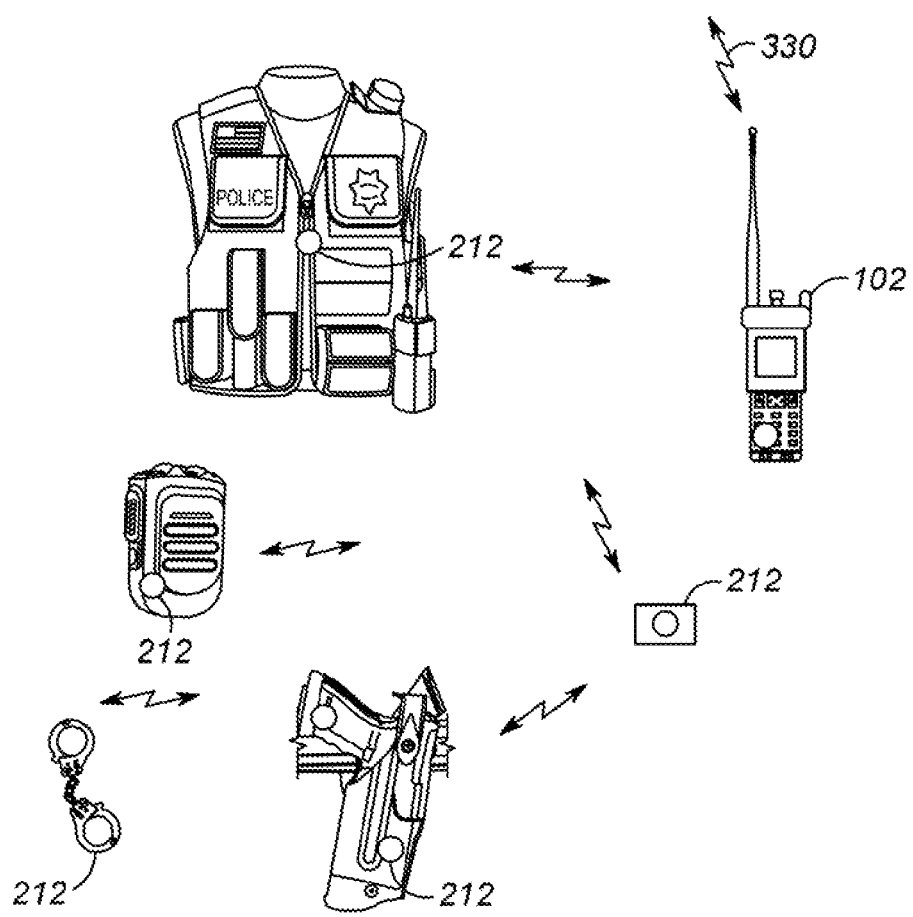
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 are that attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

As described above, hub 102 comprises a digital assistant having a changeable persona (not shown in FIG. 3). Devices 212 notify hub 102 of a sensed condition by sending a local status alert transmitted from the sensor as a Bluetooth message. Hub 102 in turn, may have a digital assistant provide information to the officer, and/or forward the local status alert over a wide-area network (e.g., RAN/Core Network) to computer 214. In alternate embodiments of the present invention, hub 102 may forward the local status alert to mobile and non-mobile peers (shift supervisor, peers in the field, etc), or to the public via social media. RAN core network preferably comprises a network that utilizes a public-safety over-the-air protocol. Hub 102 may also receive an incident type or assignment from a dispatch center as described above.

As discussed above, a problem exists in that prior-art digital assistants tend to always speak in the same persona, with the same voice (gender, tone, cadence, timbre, phonation, resonance, . . . , etc.). Because of this, digital assistant are very poor at conveying urgency, importance, or other characteristics of an utterance. In order to address this issue, hub 102 comprises a digital assistant that is capable of changing its persona (e.g., changing its voice) based on an incident type or a detected public-safety event.

Figure 4:
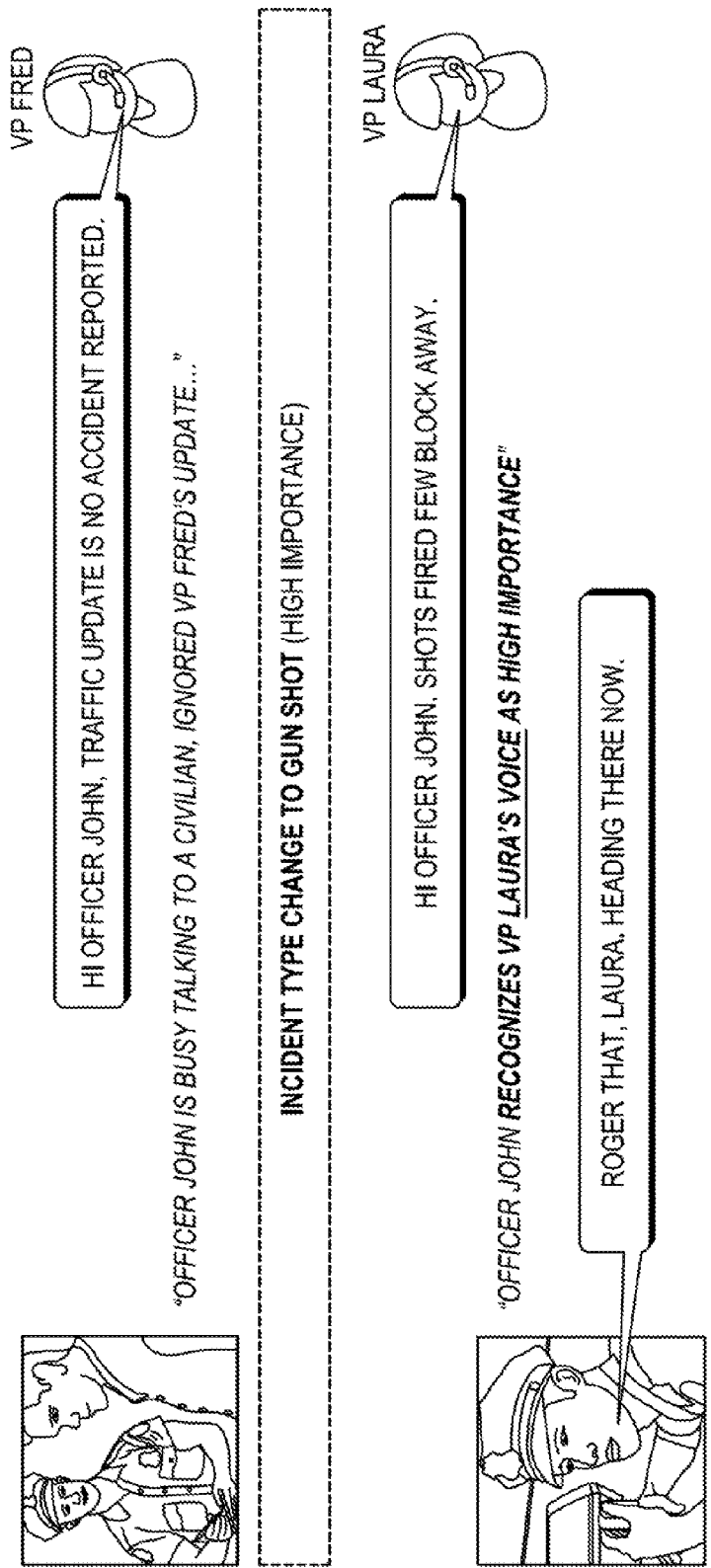
FIG. 4 illustrates a digital assistant changing personas in response to an incident.

This is illustrated in FIG. 4. In particular, FIG. 4 shows an example of a digital assistant changing its persona in response to an incident being detected. As shown in FIG. 4 Officer John's digital assistant (a virtual partner (VP) in the public-safety space) has a persona of "Fred" when reporting low-priority information such as traffic. In this example "Fred" reports that no traffic incidences have been reported. Officer John is busy talking to a civilian and often ignores "Fred's" voice. As shown in FIG. 4, a gunshot has been detected and Officer John's digital assistant is changed to "Laura". Since "Laura" only appears during high-priority incidents, Officer John knows that anything said by "Laura" is important. In this example, "Laura" reports that shots have been fired a few blocks away.

It is envisioned that there are multiple ways digital assistant 250 may "learn" that a particular incident has occurred. Several of them will be described below:

- A digital assistant application may receive sensor data and change its persona based on sensor data. For example, one of sensors 212 may indicate that an incident has been detected and report this information to hub 102 via Bluetooth links 212.
- Hub 102 may receive notification of an incident from dispatch center 214. In this situation dispatch center 214 will be notified of a particular incident (for example, via a 911 call). An officer will be assigned to the incident, and their hub provided with information about the incident (for example, they hub may receive an incident ID such as a CAD ID). Digital assistant 250 may change persona 251 based on the type of incident provided by dispatch center 214 (e.g., change its persona 251 based on the CAD ID).
- A digital assistant application may receive geo-location data from the devices (e.g. GPS sensor, indoor location sensor) along with a location where a particular incident is occurring (from the dispatch center). When the digital assistant detects itself near the incident location, the virtual assistant persona will be changed.

In each situation described above, digital assistant may change from a first persona to a second persona, the first and the second persona differing by gender, tone, cadence, timbre, volume, pitch, phonation, resonance, emotion, and/or avatar. For example, during a first public-safety incident, the digital assistant may use a first avatar with a male voice, while during a second public-safety incident, the digital assistant may use a second avatar with a female voice. In another example, during a first public-safety incident, the digital assistant may use a first avatar with a male voice having a first characteristic (e.g., first cadence), while during a second public-safety incident, the digital assistant may use the first avatar with the male voice having a second characteristic (e.g., second cadence). As is evident, there are a number of ways a digital assistant may change its manner of speaking.

Figure 5:
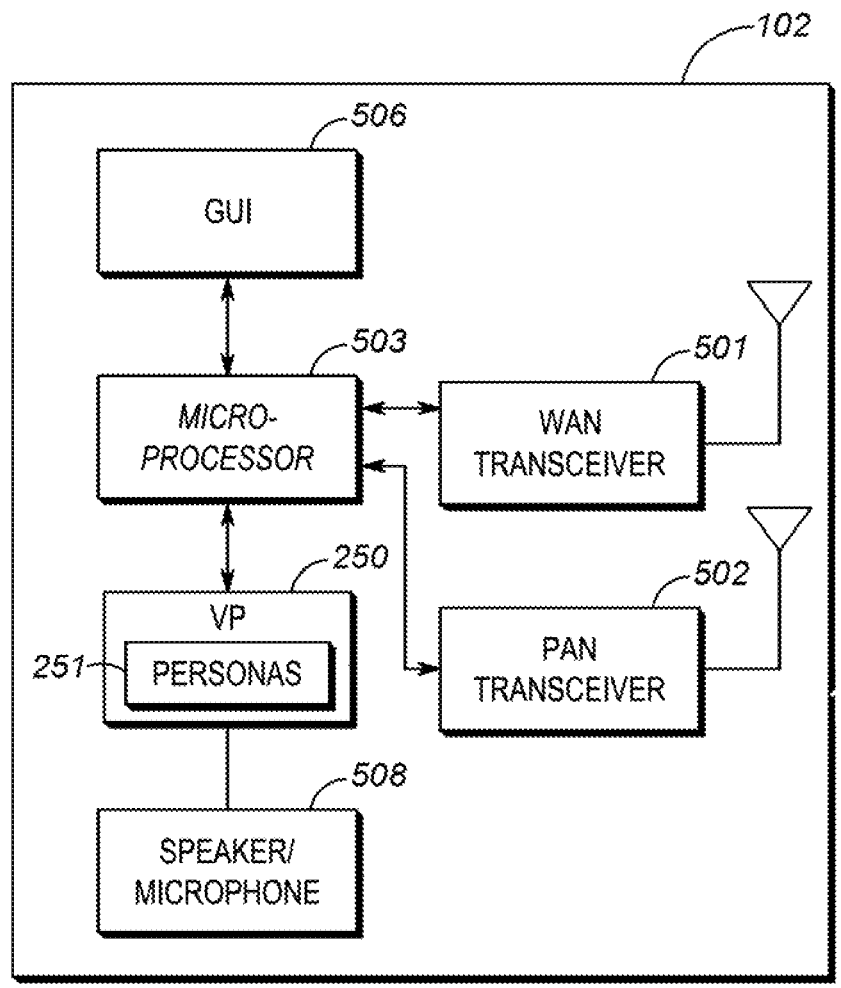
FIG. 5 is a block diagram of a PAN device of FIG. 2.

FIG. 5 is a block diagram of a PAN device. In particular FIG. 5 shows those components (not all necessary) of hub 102 in order for digital assistant 250 to change persona in response to an incident (e.g., a public-safety incident). As shown, hub 102 may include a wide-area-network (WAN) transceiver 501 (e.g., a transceiver that utilizes a public-safety communication-system protocol), PAN transceiver 502 (e.g., a short-range transceiver), GUI 506, logic circuitry 503, speaker 508 and digital assistant 250 having multiple possible personas 251, each differing. In other implementations, hub 102 may include more, fewer, or different components.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network.

PAN transceiver 502 may be well known short-range (e.g., 30 feet of range) transceivers that utilize any number of network system protocols. For example, PAN transceiver 502 may be configured to utilize Bluetooth communication system protocol for a body-area network, or a private 802.11 network.

GUI 506 comprises provides a way of displaying information and receiving an input from a user. For example, GUI 506 may provide a way of conveying (e.g., displaying) information conveyed from digital assistant 250. Part of this information my comprise an image of a digital assistant (e.g., an avatar) that changes along with the persona. In order to provide the above features (and additional features), GUI 506 may comprise a touch screen to provide a man/machine interface.

Speaker/microphone 508 provides a mechanism for receiving human voice and providing it to the virtual partner, along with providing audible information generated by the digital assistant (e.g., a persona and voice).

Logic circuitry 503 comprises a digital signal processor (DSP), general purpose microprocessor, a programmable logic device, or application specific integrated circuit (ASIC) and is configured to provide necessary information to digital assistant 250 so that the digital assistant may determine if any public-safety incidents have been detected.

It should be noted that the block diagram illustrated in FIG. 5 shows digital assistant 250 as a stand-alone component in hub 102. However, one of ordinary skill in the art will recognize that digital assistant 250 and any persona 251 may exist as software applications existing on memory (not shown) that when executed by processor 503, configure hub 102 as described above. This is illustrated in FIG. 6.

Figure 6:
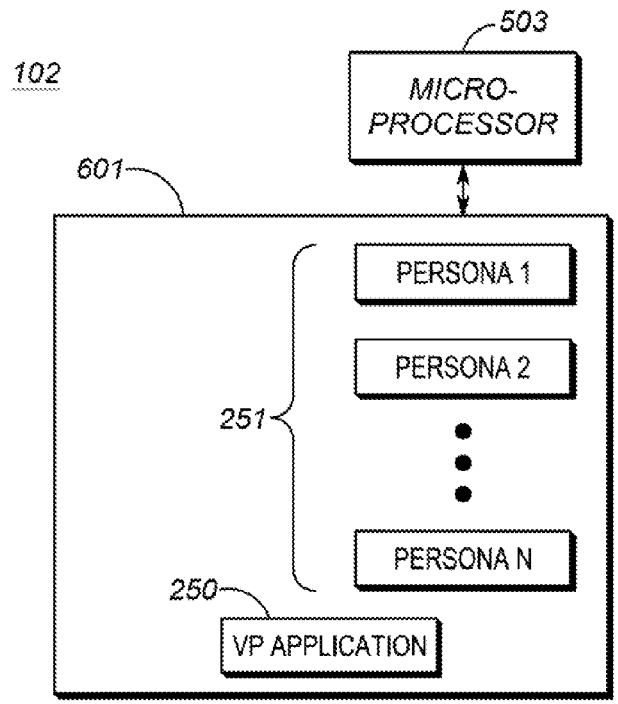
FIG. 6 is a PAN device of FIG. 2.

As shown in FIG. 6, memory 601 comprises VP application 250 (digital assistant application 250) and multiple personas 251. These are stored as a set of instructions, that when executed by processor 503, configure hub 102 as described above.

The device of FIG. 5 and FIG. 6 provides for a device existing as part of a personal-area network (PAN) that comprises a short-range transceiver 502 configured to communicate with other PAN devices, a long-range transceiver 501 configured to communicate with a public-safety dispatch center, and a digital assistant (or virtual partner) 250 configured to convey information (via GUI 506 or speaker 508) to a user with a first persona, determine that a public-safety incident has occurred by receiving a notification of the public-safety incident via the short-range transceiver and/or the long-range transceiver, determine a second persona that is based on the public safety incident, and convey information to the user about the public-safety incident using the second persona.

As discussed above, the long-range transceiver may receive the notification of the public-safety incident from a public-safety dispatch center. This notification may be part of an assignment of an officer to a particular incident, which may comprise assigning the officer to a particular CAD ID.

Alternatively, the short-range transceiver may receive the notification of the public-safety incident from a sensor 212 as part of the PAN. For example, one of sensors 212 may indicate that an incident has been detected and report this information to hub 102 via Bluetooth links 212. Expanding on this, a gun-draw sensor may detect that a gun has been drawn, a location sensor may detect that the officer has entered a particular location of an incident, a PAN camera may detect a wanted person, or a dangerous situation, . . . , etc. All of these may trigger a persona change of the digital assistant (e.g., digital assistant changing from a first voice type to a second voice type).

Figure 7:
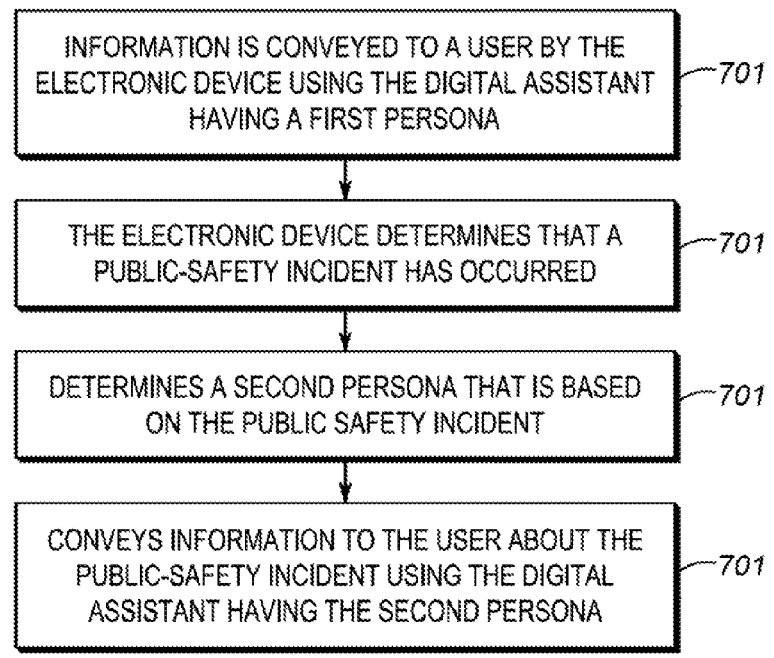
FIG. 7 is a flow chart showing operation of the PAN device of FIG. 5 and FIG. 6.

FIG. 7 is a flow chart showing operation of a hub of FIG. 5 and FIG. 6. More particularly, the logic flow of FIG. 7 shows those steps (not all necessary) for an electronic device (e.g., hub 102) to change a persona of a digital assistant. The logic flow begins at step 701 where information is conveyed to a user by the electronic device using the digital assistant having a first persona. As discussed above, the information may be conveyed visually through GUI 506 and/or audibly through speaker 508.

The logic flow continues to step 703 where the electronic device determines that a public-safety incident has occurred. This is preferably accomplished by microprocessor receiving information via the WAN transceiver 501 and/or the PAN transceiver 502 and passing this information to digital assistant 250.

As discussed above, the determination that a public-safety incident has occurred may comprise receiving a notification of the public-safety incident via WAN transceiver 501 from a public-safety dispatch center 214, (the notification may comprise a computer-aided-dispatch identification (CAD ID)). Additionally, the step of determining that a public-safety incident has occurred may comprise receiving a notification from a personal-area-network (PAN) sensor via PAN transceiver 502.

The logic flow continues to step 705 where digital assistant 250 determines a second persona that is based on the public safety incident. As discussed above the first persona may comprise a first voice type and wherein the second persona comprises a second voice type. Additionally, the first persona may comprise a first avatar and the second persona comprises a second avatar. Additionally, the first persona may comprise a person having a first gender and the second persona comprises a person having a second gender, differing from the first gender.

Finally, at step 707 virtual assistant 250 conveys information to the user about the public-safety incident using the digital assistant having the second persona.

It should be noted that the information conveyed to a user by the digital assistant can be in an automated (e.g., without user input/query) or semi-automated (e.g., with some user input) fashion. The information provided to the user can be based on explicit requests for such information posed by the user via an input (e.g., such as a parsed natural language input or an electronic touch interface manipulation associated with an explicit request) in which the electronic digital assistant may reactively provide such requested valuable information, or can be based on some other set of one or more context or triggers in which the electronic digital assistant may proactively provide such valuable information to the user absent any explicit request from the user. The context triggers may be a signal from a sensor.

In the above embodiments, a trigger to a digital assistant may elicit a particular response. The response will have a persona based on a current public-safety incident assigned to an officer, or based on a sensor that triggered the response. So, for example, asking the digital assistant, "how's the weather outside", will elicit the same response, for example (clear and 25 degrees), however, a particular persona will be used for the response, the persona dependent upon a current incident assigned to a user, or a current sensor that triggered the response. So the answer may be, "clear and 25" in Fred's voice if the officer is assigned to a first incident, and may be "clear and 25" in Amy's voice if the officer is assigned to a second incident.

Thus, the digital assistant described above is capable of understanding natural language, and may complete electronic tasks in response to user voice inputs, among other additional or alternative types of inputs. The persona will change based on an incident assigned to a user, or based on a sensor that triggered the digital assistant to act. As described, the digital assistant may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

In the foregoing specification, specific embodiments have been described. However, one of ordinary skill in the art appreciates that various modifications and changes can be made without departing from the scope of the invention as set forth in the claims below. For example, while the above technique was described with reference to broadcast an audio as virtual assistant to the user, one of ordinary skill will recognize that the audio could be conveyed in covert mode e.g. earpiece, headset, smart helmet, or any other audio conveying method e.g. collar radio, neck radio, RSM, etc. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of changing a persona of a digital assistant, the method comprising the steps of:
    conveying information to a user by an electronic device using the digital assistant having a first persona;
    receiving a notification of a public-safety incident from a public-safety dispatch center, wherein the notification comprises a computer-aided-dispatch identification (CAD ID);
    the electronic device determining that the public-safety incident has occurred based on the received CAD ID;
    the electronic device determining a second persona that is based on the CAD ID; and
    the electronic device conveying information to the user about the public-safety incident using the digital assistant having the second persona.

2. The method of claim 1 wherein the first persona comprises a first voice type and wherein the second persona comprises a second voice type.

3. The method of claim 2 wherein the first persona comprises a first avatar and the second persona comprises a second avatar.

4. The method of claim 1 wherein the first persona comprises a persona having a first gender and the second persona comprises a person having a second gender, differing from the first gender.

5. The method of claim 1 wherein the step of determining that a public-safety incident has occurred further comprises the step of receiving a notification from a personal-area-network (PAN) sensor.

6. The method of claim 1 wherein the steps of conveying information comprises the steps of conveying audible information.

7. A method comprising the steps of:
    conveying information to a user using a digital assistant having a first voice of a first gender;
    receiving a computer-aided-dispatch identification (CAD ID) from a public-safety dispatch center that a public-safety incident has occurred;

determining a second voice having a second gender that is based on the CAD ID received from the public-safety dispatch center; and conveying information to the user about the public-safety incident using the digital assistant having the second voice.

8. A device existing as part of a personal-area network (PAN), the device comprising:

a short-range transceiver configured to communicate with other PAN devices;

a long-range transceiver configured to communicate with a public-safety dispatch center;

a digital assistant configured to convey information to a user with a first persona, determine that a public-safety incident has occurred by receiving a notification of the public-safety incident via the short-range transceiver and/or the long-range transceiver, determine a second persona that is based on the public safety incident, and convey information to the user about the public-safety incident using the second persona;

wherein the notification via the short-range transceiver comprises a sensor as part of the PAN; and wherein the notification via the long-range transceiver comprises a computer-aided-dispatch identification (CAD ID) received from a public-safety dispatch center.

9. The device of claim 8 wherein the first persona comprises a first voice type and wherein the second persona comprises a second voice type.

* * * * *